United States Patent [19]

Hoashi et al.

[11] Patent Number: 5,034,881
[45] Date of Patent: Jul. 23, 1991

[54] METHOD OF AND SYSTEM FOR CONTROLLING COMMON BUS

[75] Inventors: Kouichi Hoashi; Noriaki Uchida, both of Hadano, Japan

[73] Assignee: Hitachi, Ltd., Tokyo, Japan

[21] Appl. No.: 340,476

[22] Filed: Apr. 19, 1989

[30] Foreign Application Priority Data

Apr. 22, 1988 [JP] Japan .................................. 63-98105

[51] Int. Cl.⁵ ...................... G06F 13/36; G06F 13/37; G06F 13/374
[52] U.S. Cl. ...................................... 364/200; 364/900
[58] Field of Search ................................. 364/900, 200

[56] References Cited

U.S. PATENT DOCUMENTS

| | | | |
|---|---|---|---|
| 3,983,540 | 9/1976 | Keller et al. | 364/200 |
| 4,232,294 | 11/1980 | Burke et al. | 364/200 |
| 4,320,457 | 3/1982 | Tanikawa | 364/200 |
| 4,385,350 | 5/1983 | Hansen et al. | 364/200 |
| 4,458,314 | 7/1984 | Grimes | 364/200 |
| 4,463,445 | 7/1984 | Grimes | 364/200 |
| 4,470,112 | 9/1984 | Dimmick | 364/200 |
| 4,485,438 | 11/1984 | Myrmo et al. | 364/200 |
| 4,488,218 | 12/1984 | Grimes | 364/200 |
| 4,489,379 | 12/1984 | Lanier et al. | 364/200 |
| 4,495,573 | 1/1985 | Ballegeer et al. | 364/200 |
| 4,541,043 | 9/1985 | Ballegeer et al. | 364/200 |
| 4,547,850 | 10/1985 | Genma | 364/200 |
| 4,641,266 | 2/1987 | Walsh | 364/200 |
| 4,722,072 | 1/1988 | Price | 364/200 |
| 4,766,536 | 8/1988 | Wilson, Jr. et al. | 364/200 |
| 4,858,173 | 8/1989 | Stewart et al. | 364/900 |

Primary Examiner—Michael R. Fleming
Assistant Examiner—Christopher B. Shin
Attorney, Agent, or Firm—Antonelli, Terry, Stout & Kraus

[57] ABSTRACT

In a common bus control method of a distributed arbitration in which a contention between bus usage requests from a plurality of units connected to a common bus is arbitrated by each unit by use of an identifier representing a priority level and assigned thereto, unit identifiers are dynamically exchanged between a unit having a highest priority level and a unit having a lower priority level, thereby enabling the respective units to use the common bus at a balanced usage frequency.

8 Claims, 4 Drawing Sheets

METHOD OF AND SYSTEM FOR CONTROLLING COMMON BUS

BACKGROUND OF THE INVENTION

1. Field of the Invention

The present invention relates to a method of controlling a common bus, and in particular, to a method of controlling a common bus in a computer system, the common bus, a plurality of units each having a distributed arbitration function in which each unit arbitrates a contention or conflict of bus usage requests from the plural units connected to the common bus based on a priority associated with a respective unit identifier assigned to each unit.

2. Description of the Related Art

In a common bus control, there have been problems that the utilization efficiency of the bus is lowered due to an occurrence of a wait time and that the bus usage frequency is concentrated on a particular unit in association with a priority control. As a means to solve such problems, there has been known a method, for example, as described in the JP-56-97129, in which there is uniquely and independently provided on the common bus a common bus control circuit for sequentially changing over the priority levels of the respective units receiving common bus usage requests so as to assign the priority level to the units in a dynamic fashion, such that the alteration of the priority levels and arbitration of the bus usage requests are controlled by the common bus control circuit in a concentrated fashion.

On the other hand, there has been recently employed a common bus control method, such as a small computer system interface (ScSi) as a typical example, in which the arbitration of the bus usage requests is distributed to the respective units connected to the common bus. In this method, a unit desiring to use the bus, upon issuance of a bus usage request, drives a bit on the common bus corresponding to the unit identifier, so that the respective units monitor the bit to compare the bit with the identifier thereof, thereby effecting the arbitration.

According to the above method, since the priority levels for the bus usage right are determined by weights of the identifiers associated with the respective units, although there does not take place an occurrence of a wait time, there arises a problem that the bus usage frequency is concentrated on a particular unit.

In the distributed arbitrating method, however, since each unit is required to recognize the priority levels of all the units, it is difficult to effect the control for alteration of the priority levels independently of the units, which has been describe din the example above.

SUMMARY OF THE INVENTION

It is therefore an object of the present invention to provide a common bus control method adopting a distributed arbitration in which the concentration of the bus usage frequency on a particular unit is prevented while minimizing the deterioration of the bus utilization efficiency caused due to an occurrence of a wait time.

The object above is achieved according to one feature of the present invention such that a unit identifier determining a priority level of the bus usage right is sequentially exchanged in a dynamic fashion essentially between a unit having the highest-level unit identifier and a unit having a lower-level unit identifier, thereby making the priority levels or the unit identifiers possessed by the respective units balanced with respect to time.

According to this solution, since a presentation of a bus usage right issued by a unit having the highest-priority level unit identifier initiates the exchange of the unit identifier, there does not occur a case where a wait time is required for the unit identifier exchange. In consequence, the bus usage rights of the units are averaged among the units only through the identifier exchange effected between the units.

BRIEF DESCRIPTION OF THE DRAWINGS

These and other objects and advantages of the present invention will become apparent with reference to the following description and accompanying drawings wherein.

DESCRIPTION OF THE PREFERRED EMBODIMENTS

Figure 1:
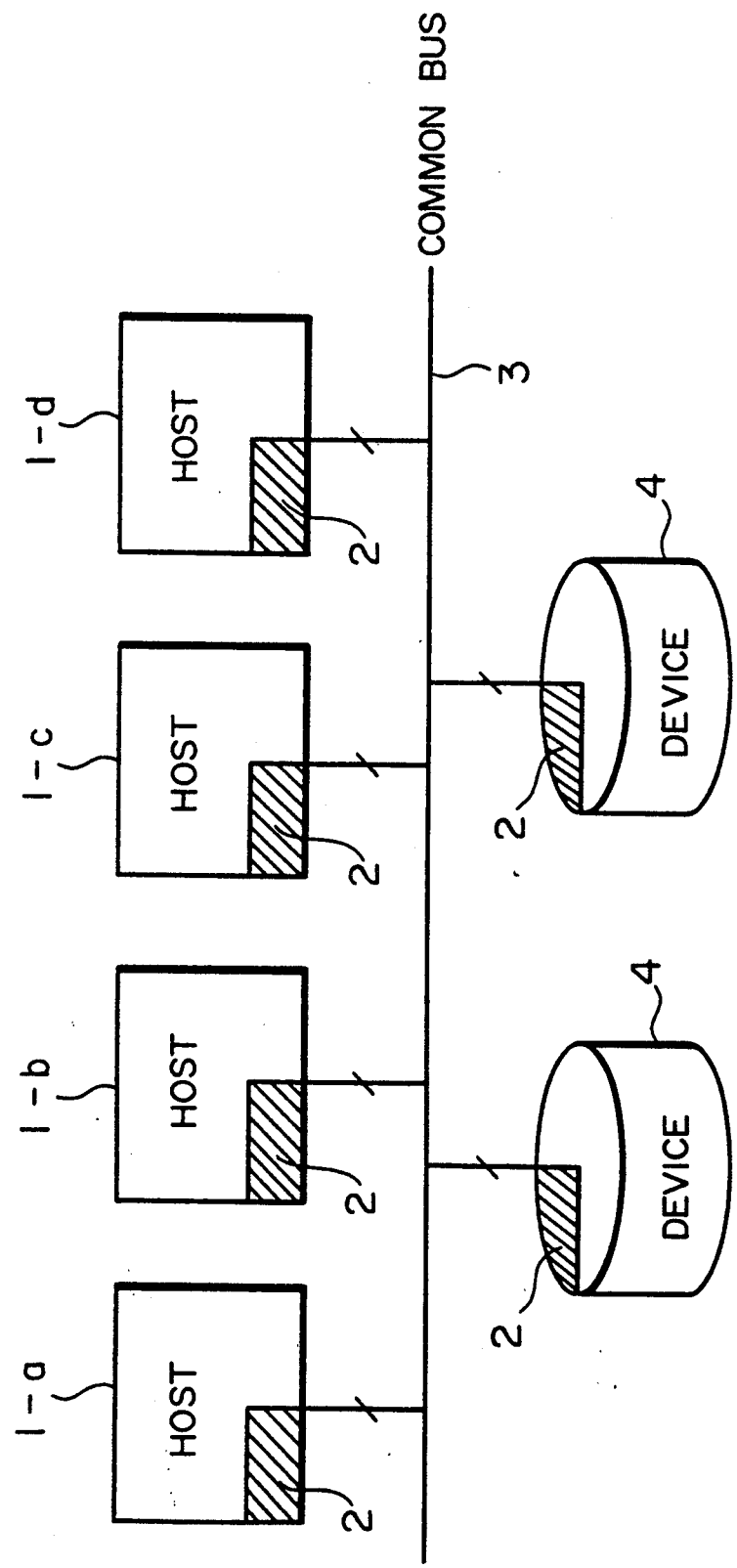
FIG. 1 shows a schematic diagram showing the overall configuration of a common bus control method according to the present invention.

Referring now to the drawings, description will be made in detail of an embodiment according to the present invention.

FIG. 1 shows an embodiment of the overall configuration of a common bus control method according to the present invention in which four hosts or host systems share two devices via a common bus controlled by distributed arbitration. Reference numerals 1-a to 1-d indicate the hosts also called units, 2 designates a common bus arbitration section which sends an identifier onto the common bus for an arbitration and which conducts judgement of a common bus usage right based on a comparison between the identifier (IS) on the common bus and its own identifier, 3 identifies the common bus, and 4 designates the devices.

Figure 2:
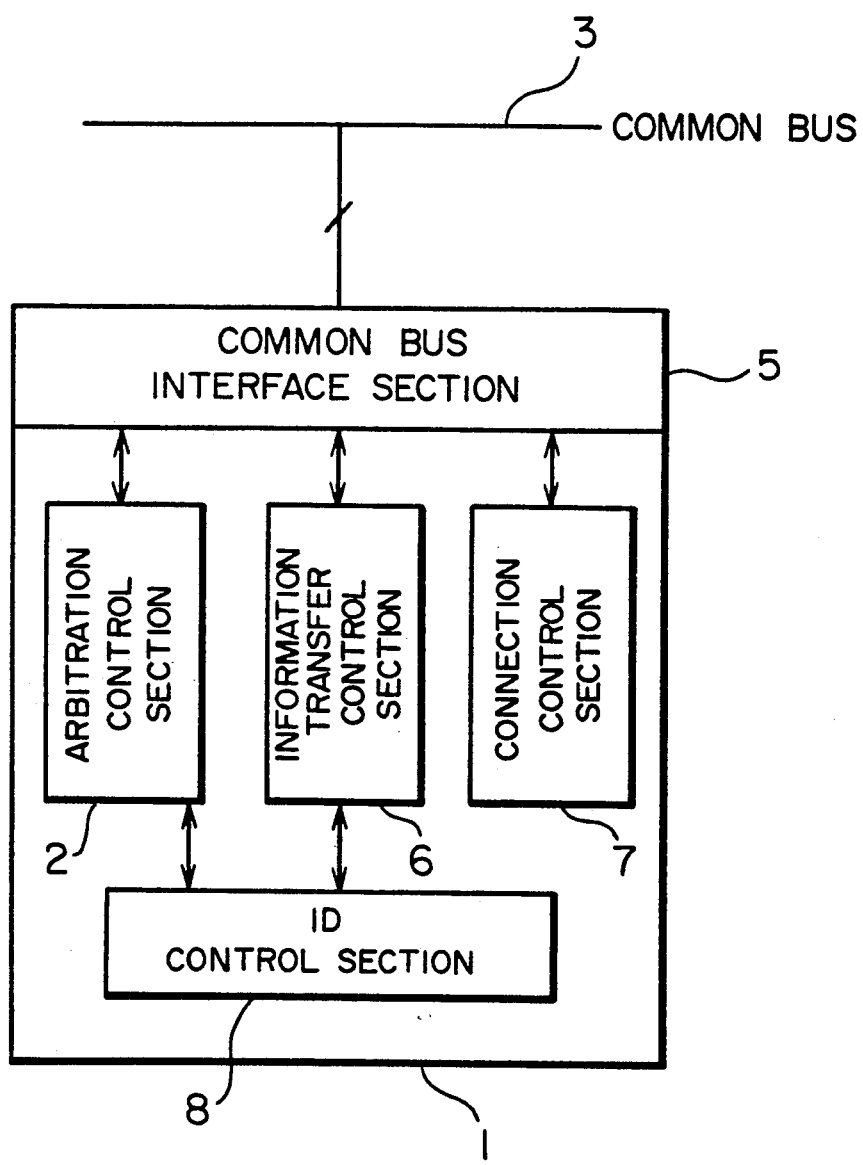
FIG. 2 is a block diagram schematically showing an embodiment of an internal configuration of a unit according to the present invention.

In addition, FIG. 2 is a block diagram showing an embodiment of an internal configuration of a unit according to the present invention comprising a common bus interface section 5 for physically and electrically connecting the units to the common bus 3, an information transfer control section 6 for controlling communications of information between the units via the common bus 3, a connection control section 7 for controlling selection of a connection objective unit, to recognize a selection state, to reply to a connection source, and to maintain the connection state between units, and an identifier control section 8 for keeping its own identifier, for sending to the common bus 3 a unit identifier at an arbitration and at a select indication, and to control an exchange of identifiers with the connection objective unit. Description has been given of the configuration example of the common bus control method in this embodiment.

Next, description will be given of a concrete operation example in this configuration.

In order to average the priority levels, a host (unit) having the highest-level unit identifier undergoes an identifier exchange at an appropriate point of time.

In the case like this embodiment where the devices are shared among multiple hosts, the identifier exchange is carried out only between the hosts. This is because the identifier of the device, when viewed from the host side, possesses a meaning as address information and hence this operation prevents the corresponding relationships of the devices from being destroyed among the plural hosts. In addition, the appropriate point of time above is generally determined, for example, depending on the period of time which has elapsed after an identifier exchange or on the access frequency.

Next, description will be given of an identifier exchange with reference to an example of the case where the identifier exchange is accomplished by use of a protocol conforming to the SCSi standards.

First, a unit having the highest priority level presents a request to use the bus. In this situation, the arbitration control section 2 drives a bit corresponding to its own identifier on the common data bus. There is a correspondence between the priority levels and the weight values of the bits; in consequence, the units taking part in the arbitration monitor the common data bus to judge whether or not its own unit wins the arbitration and hence acquires the bus. In this case, even if there occurs a contention between the bus usage requests issued from the plural units, the unit having the highest priority level can get the bus usage right in any case.

Subsequently, the connection control section 7 for connecting a lower-level unit drives a bit of its own identifier and a bit of an identifier of a connection objective unit on the common data bus. The other units respectively monitor the bus so as to detect that the identifiers are on the bus and to recognize which one of the units is requiring a connection. When the connection objective unit responds to the connection source, the connection is completed, and then through a data transfer between the units, the unit at the higher level supplies the lower-level unit with information for an identifier exchange. This may be accomplished, for example, by use of a transfer of data including one byte called a message. In a system to which the present invention is applied, there is defined a one-byte code (e.g. $(F0)_{16}$) indicating an identifier exchange. The identifier exchange can be effected only by transferring this message because the identifiers are known when the connections are established. In the case where the lower-level unit can cope with the identifier exchange, the lower-level unit transfers to the higher-level unit a code (e.g. $(F1)_{16}$) similarly defined in the system, which causes the identifiers to be exchanged between these units. If it is impossible to effect the identifier exchange (e.g. in a wait state to be selected again by another unit), there is transmitted a code (e.g. $(F2)_{16}$) requesting a retry after a predetermined period of time is elapsed.

Thereafter, both units effect disconnection so as to complete the identifier exchanged therebetween.

Figure 3:
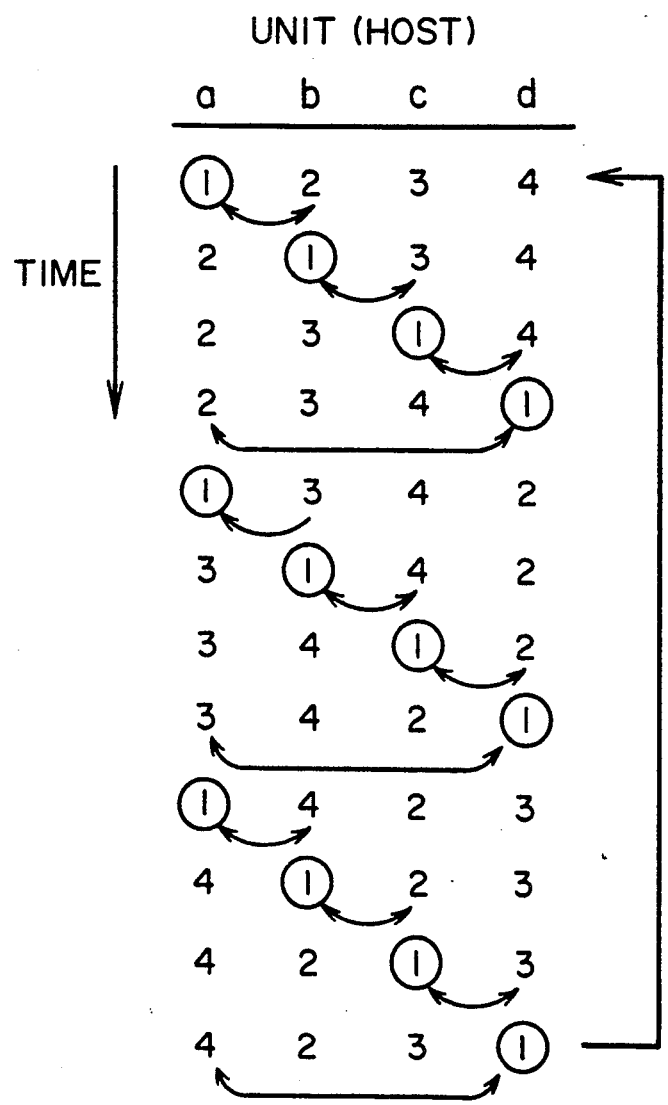
FIG. 3 is an explanatory diagram useful to explain an example of transition of the priority levels assigned to the respective units in a case where the identifiers are sequentially exchanged among four units.

In a system where the identifier is to be exchanged between two or more units, it is possible to select a plurality of lower level units. In this case, for example, if a unit possesses a priority level n immediately before the unit is assigned with the highest priority level, a lower-level unit having a priority level n+1 is selected for the current connecting operation. In addition, in the initial state or when a unit possesses the lowest priority level immediately before the unit is assigned with the highest priority level, a lower-level unit having the second priority is selected for the connecting operation. That is, in the case where the identifier exchange is achieved among four units, a unit of which the priority is changed from the second level to the highest level connects to a unit having the third priority level and then exchanges the identifier with that unit; a unit of which the priority is changed from the fourth level to the highest level connects to a unit having the second priority level and then exchanges the identifier with that unit; and so on. FIG. 3 shows the transition of the priority level in the respective units when the identifiers are exchanged among four units.

In this case, a cycle of the identifier exchange operations is completed through 12 operation steps, which averages the priority levels assigned to the respective units. Incidentally, the method of selecting a lower-level unit for the identifier exchange is not limited by that described above, namely, the priority levels of the bus usage right can be averaged by use of another method.

Figure 4:
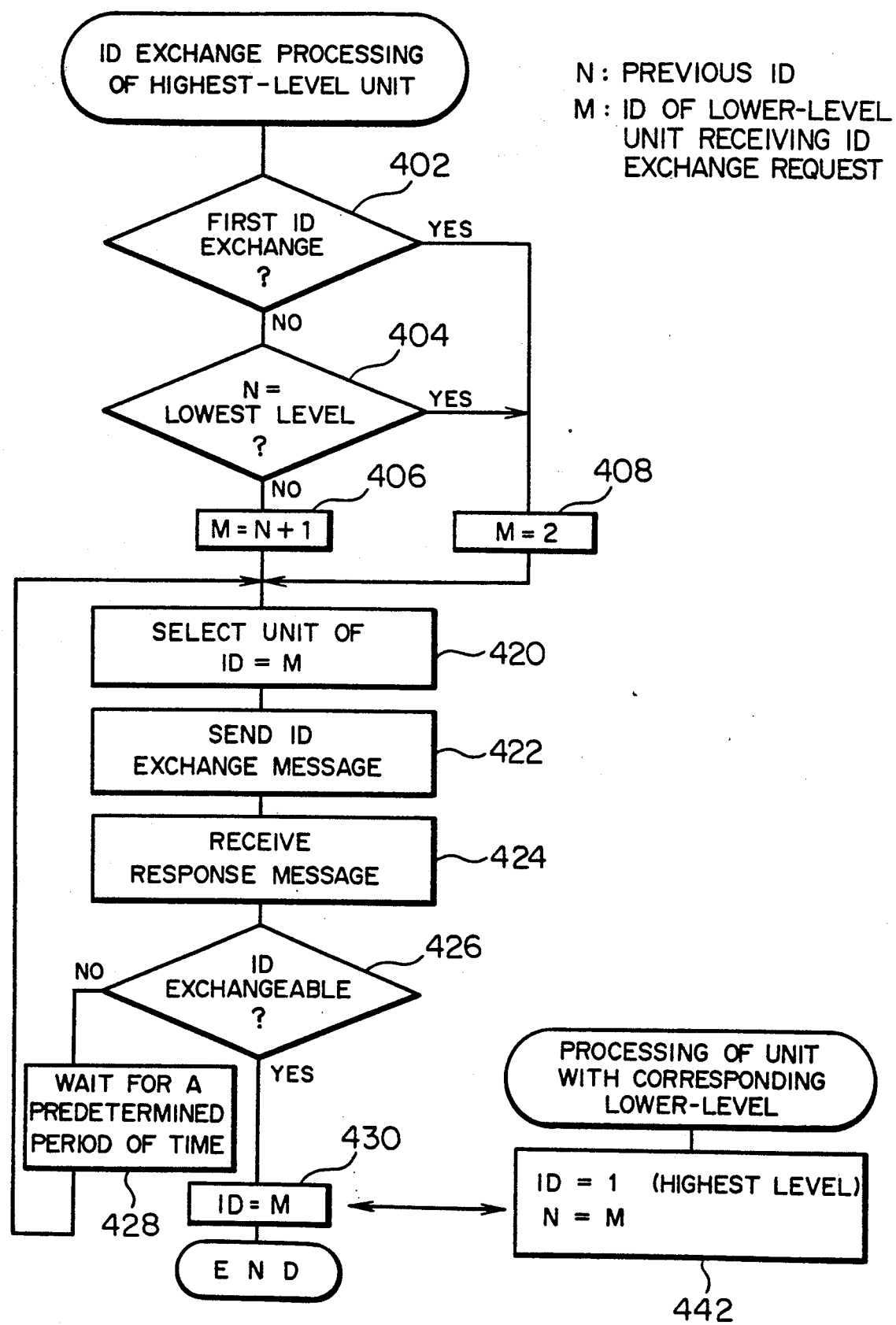
FIG. 4 is a flowchart showing an example of an operation of identifier exchange processing.

Next, referring to the flowchart of FIG. 4, description will be given of an operation example of the identifier exchange processing.

First, the identifier exchange processing of the highest-level unit will be described.

The identifier exchange is first recognized (step 402). For the first exchange, "2" is set to the identifier M of a lower-level unit to receive an identifier exchange request (step 408). If the exchange operation has already been achieved, it is judged whether or not the previous identifier N is at the lowest level. If this is the case, "2" is set to M (step 408); otherwise, M is loaded with a value obtained by adding one to the previous value, identifier +1 (step 406).

Subsequently, a unit having an identifier of the value of M is selected (step 420) and then an identifier exchange message is transmitted (step 422). A response message thereto is received (step 424) and then it is judged whether or not the identifier can be exchanged (step 426). If the exchange is possible, the value of M is set to the identifier (step 430); otherwise, control returns to the step 420 to effect a wait operation for a predetermined period of time (step 428).

In the processing of the associated lower-level unit, "1" indicating the highest level is set to the identifier and the value of M is set to N (step 442).

Figure 5:
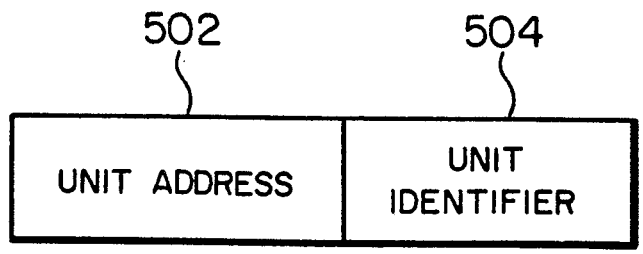
FIG. 5 is a schematic diagram showing an example of the format of data to be communicated between units.

Incidentally, FIG. 5 shows a format example of data to be communicated between the units. Corresponding to a unit address 502, there is included a unit identifier 504 which is dynamically altered according to the teachings of the present invention.

According to the present invention, the identifier exchange is initiated in any case by a unit having the highest priority level, in consequence, the acquisition of the bus usage right for the identifier exchange cannot be set to a wait state and the priority levels are averaged.

In this embodiment, although description has been given of an example of the operations among four units, it is natural that the common bus control operations are possible in the similar method among an arbitrary number of units. In addition, if the identifier exchange is limited to some units, it is possible to partially assign the priority levels.

As described above, the common bus control method according to the present invention in the common bus control employing the distributed arbitration method leads to an effect that the concentration of the bus usage frequency to a particular unit is prevented while minimizing the decrease in the bus usage efficiency due to occurrence of a wait time.

While particular embodiments of the invention have been shown and described, it will be obvious to those skilled in the art that various changes and modifications may be made without departing from the present invention in its broader aspects.

We claim:

1. A common bus control method for a computer system having a plurality of units and a common bus connected to each of said plurality of units, wherein a contention between bus usage requests from said plurality of units is arbitrated by each unit based on a priority level represented by a respective unit identifier assigned to each unit, comprising the steps of:

selecting one unit having a lower priority level, by one of said plurality of units having the highest priority level;
   transferring an identifier exchange message from said unit having the highest priority level to said selected one unit having a lower priority level;
   transferring a receive response message from said selected one unit which receives said identifier exchange message, to said unit having the highest priority level; and
   exchanging the unit identifiers of both the selected one unit and the unit having the highest priority level in conjunction with said receive response message so that said selected one unit has the highest priority level and the unit previously having the highest priority level has the previous priority level of said selected one unit.

2. A common bus control method according to claim 1, wherein said step of selecting is executed at a predetermined duration or interval.

3. A common bus control method according to claim 1, wherein said step of selecting is executed at a suitable timing which is based on an access frequency.

4. A computer system having a plurality of units and a common bus connected to each of said plurality of units wherein a contention between bus usage requests from said plurality of units is arbitrated by each unit based on a priority level represented by a respective unit identifier assigned to each unit, each unit comprising:

means for selecting one unit having a lower priority level, when the selecting unit has the highest priority level;
   means for transferring an identifier exchange message from said selecting unit having the highest priority level to said selected one unit having a lower priority level;
   means for receiving a receive response message from said selected one unit which receives said identifier exchange message; and
   means responsive to said identifier exchange message or said receive response message from a message transferring unit for replacing the unit identifier of its own unit with the unit identifier of the unit from which it receives the identifier exchange message or the receive response message.

5. A computer system capable of a distributed arbitration in which a contention for bus usage right between bus usage requests from a plurality of units connected to a common bus is arbitrated by each unit based on a priority level represented by a respective unit identifier assigned to each unit, comprising:

identifier storage means in each of said units for storing a unit identifier representing a priority level of the bus usage right;
   unit selection means in each of said units, said unit selection means of a unit having the highest priority level selecting a unit having a lower priority level from said plurality of units and transferring an identifier exchange message to said selected unit at a predetermined timing;
   response means in each of said units for transferring a receive response message to a unit from which it has received an identifier exchange message; and
   identifier setting means in each of said units, said identifier setting means of said unit having the highest priority level setting into its identifier storage means a unit identifier of said selected unit, and said setting means of said selected unit setting into its identifier storage means an identifier indicating the highest priority level.

6. A computer system according to claim 5, wherein said response means operates to transfer a message requesting a retry with a predetermined time interval when said selected unit is not able to effect an identifier exchange.

7. A computer system according to claim 5, wherein said unit selection means of said unit having the highest priority level includes means for retaining an identifier previously stored in said identifier storage means and for obtaining an identifier which represents a lower priority than the retained identifier and selecting a unit having the obtained identifier.

8. A computer system according to claim 7, wherein said unit selection means of said unit having the highest priority level selects a unit having a second highest priority level.

* * * * *